United States Patent [19]

Chen

[11] Patent Number: 5,213,404
[45] Date of Patent: May 25, 1993

[54] AUXILIARY ILLUMINATING DEVICE OF A CAMERA

[75] Inventor: Stephen Chen, Changhua City, Taiwan

[73] Assignee: E Lead Electronic Co., Ltd., Taiwan

[21] Appl. No.: 828,315

[22] Filed: Jan. 30, 1992

[51] Int. Cl.$^5$ .............................................. G03B 15/02
[52] U.S. Cl. ......................................... 362/9; 354/126
[58] Field of Search ....................... 362/3, 9, 194, 226; 354/126, 135

[56] References Cited

U.S. PATENT DOCUMENTS 4,924,246  5/1990  Yamada ............................. 354/126
5,075,706  12/1991  Miyazaki ............................ 354/126

Primary Examiner—Allen M. Ostrager
Attorney, Agent, or Firm—Browdy and Neimark

[57] ABSTRACT

An auxiliary illuminating device of a camera including a main body having a front and a rear faces, an engaging base disposed on the front face, a first battery seat disposed on the rear face, an illuminating light, a support rod connecting the illuminating light to the main boy, and an inner circuit, characterized in that the illuminating light has a light tail including two pivotally openable portions which can be opened to expose a second battery seat contained in the light tail so as to install an additional battery therein, whereby through the coordination of the inner circuit, a single battery or two identical or two different batteries with different capacitances can be used to simultaneously supply power.

2 Claims, 5 Drawing Sheets

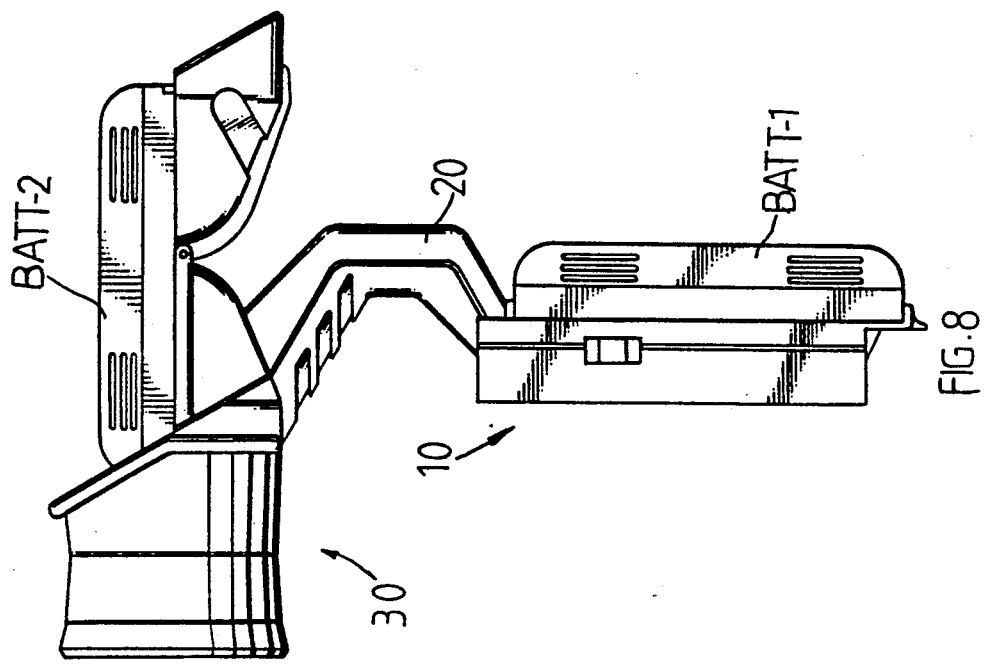
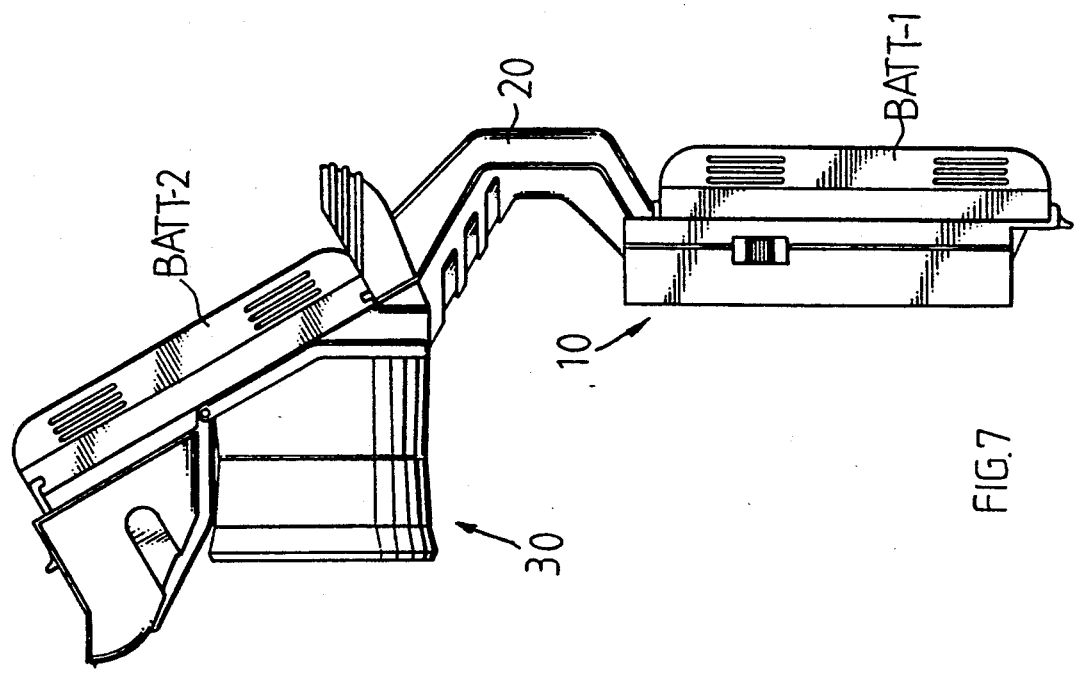

AUXILIARY ILLUMINATING DEVICE OF A CAMERA

BACKGROUND OF THE INVENTION

Conventional 8 mm portable cameras which are not provided with illuminating devices, require that additional light equipment be carried which increases the load on the camera user. Moreover, such camera at times, must be used in cooperation with the light equipment operated by other persons causing further complications when operated.

Recently a portable camera equipped with an illuminating device has been developed. Such camera is engaged with an illuminator which is powered by the same single battery so that the camera and the illuminator can be synchronously operated. This camera has reduced volume and weight. However, such camera can be only used for a short time. When the camera must be used for a long time, the single battery has been found to be insufficient to operate both the camera and the illuminator.

Therefore, an auxiliary illuminating device for a camera, which has small volume, light weight and sufficient power is needed.

SUMMARY OF THE INVENTION

It is therefore an object of this invention to provide an auxiliary illuminating device for a camera, which has a small volume, light weight and sufficient power.

The present invention can be better understood through the following description accompanying drawings, wherein:

BRIEF DESCRIPTION OF THE DRAWINGS

FIG. 7 shows the application of this invention;

FIG. 8 shows another aspect of the application of this invention; and

DETAILED DESCRIPTION OF THE PREFERRED EMBODIMENT

Figure 1:
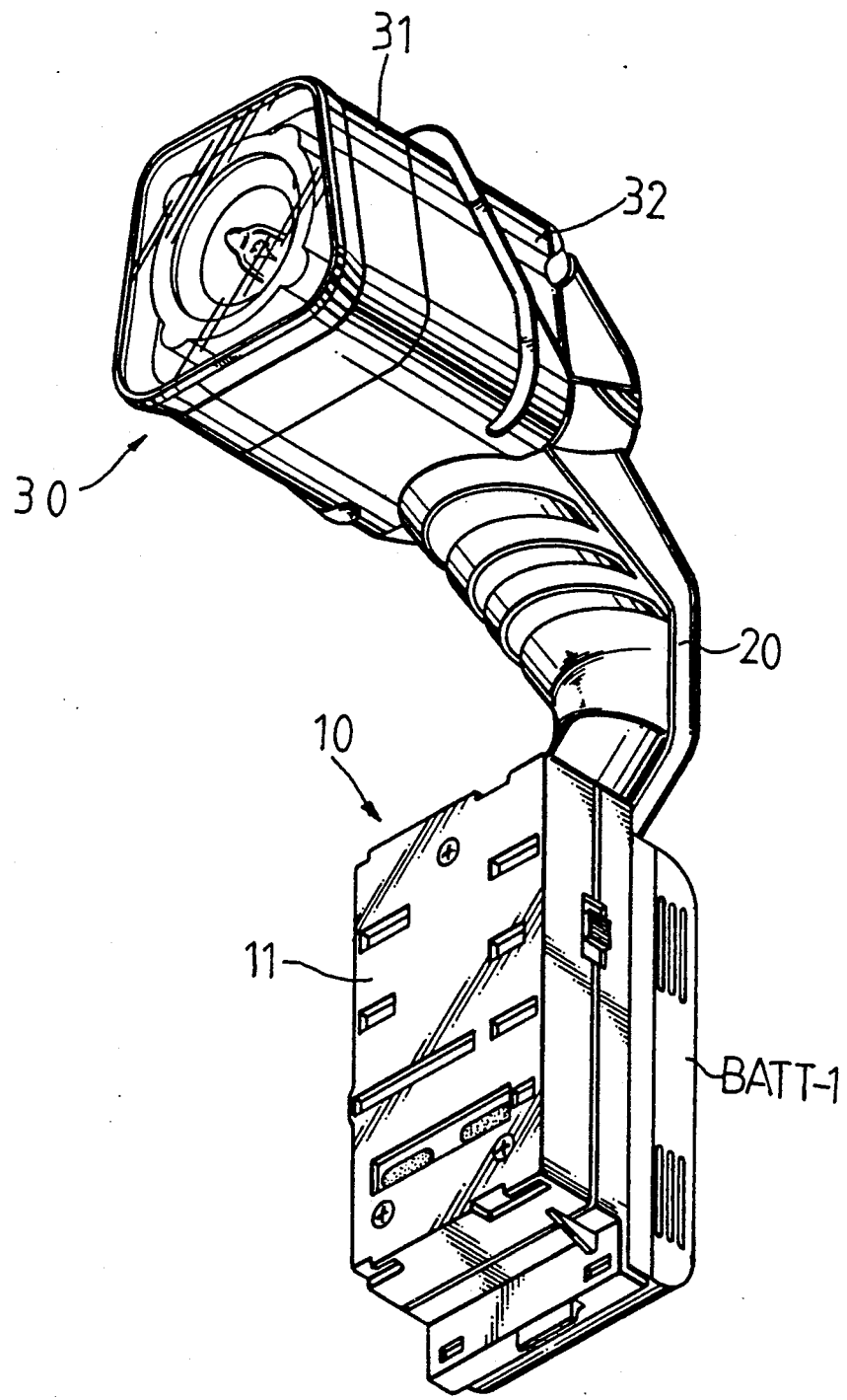
FIG. 1 is a perspective view of this invention.
Figure 2:
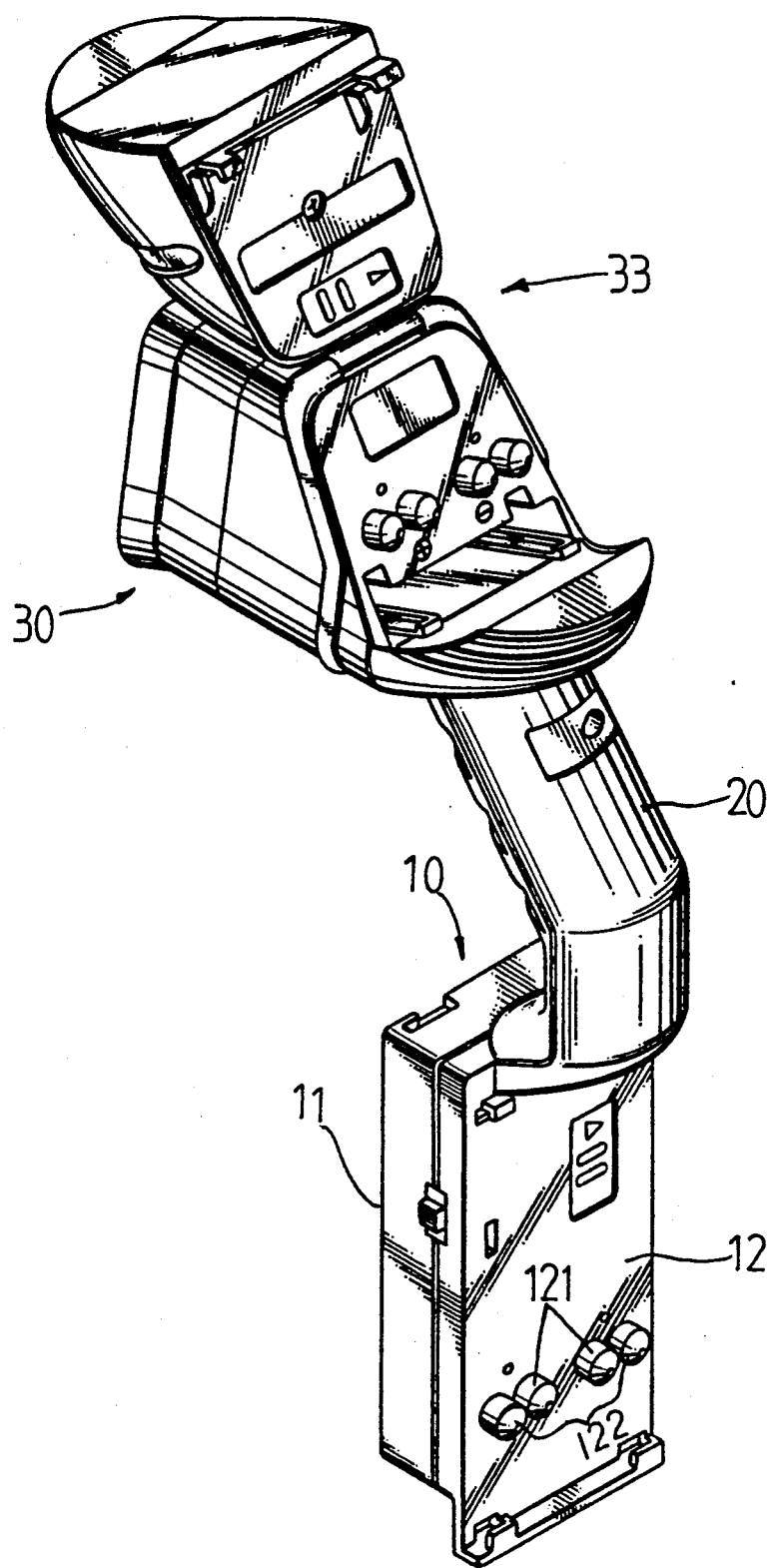
FIG. 2 is a perspective view showing another aspect of this invention.
Figure 3:
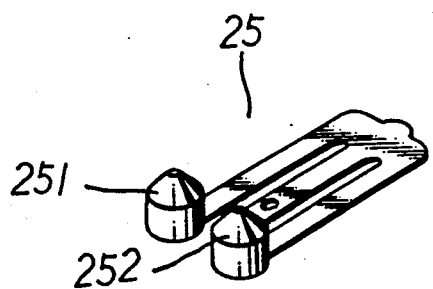
FIG. 3 shows the inner and outer resilient contacts of the battery seat of this invention.
Figure 4:
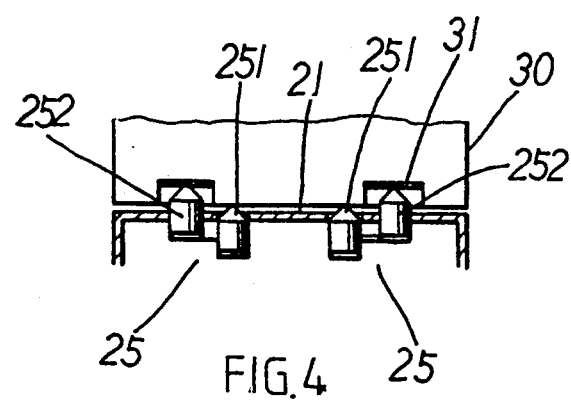
FIG. 4 shows that the battery is engaged with the battery seat.
Figure 5:
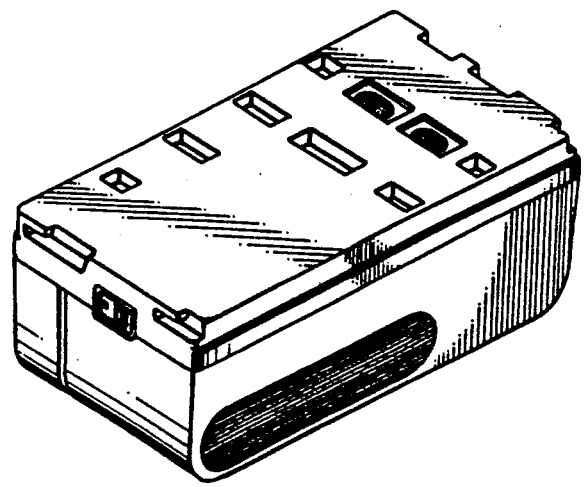
FIG. 5 shows a battery for an 8 mm camera.
Figure 6:
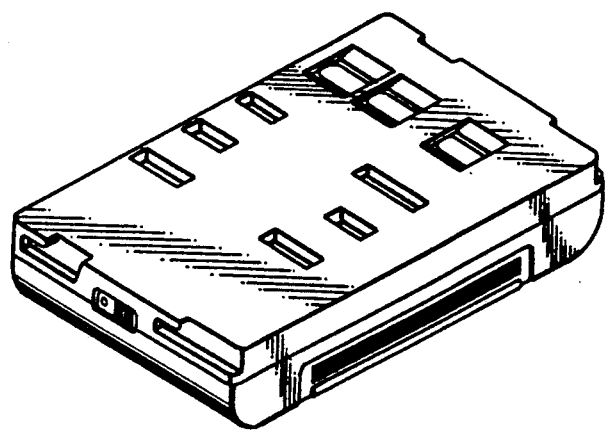
FIG. 6 shows a VHS-C type battery.

As shown in FIGS. 1 and 2, the present invention includes a main body 10, an engaging base 11 disposed on the front surface of the main body 10, a first battery seat 12 disposed on the back surface of the main body 10. The first battery seat 12 is provided with an inner and an outer resilient contacts 121, 122, as shown in FIGS. 3 and 4, which suit the 8 mm camera battery as shown in FIG. 5 or VHS-C type battery as shown in FIG. 6. The main body 10 is connected to an illuminating light 30 by a support rod 20. The light 30 includes a light head 31 and a light tail 32. As shown in FIGS. 2 and 7, the light head 32 contains a light body while the light tail 32 includes a pivotally openable portion whereby when the openable portion is pivoted open, a second battery seat 33 contained in the light tail 32 is exposed as shown in FIG. 2. The second battery seat 33 can also be formed by the pivotally openable portion shown in FIG. 8.

Figure 9:
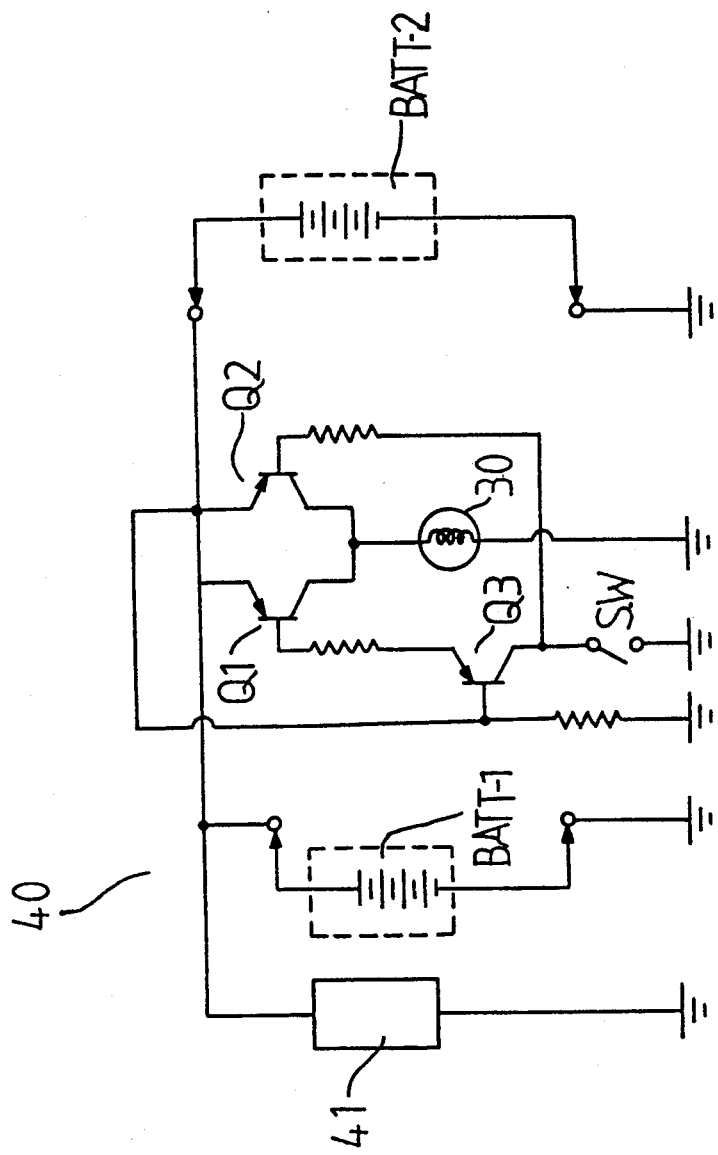
FIG. 9 is a circuit diagram of this invention.

Because the above two batteries shown in FIGS. 5 and 6 have different capacitances, the voltages thereof are different and therefore the two batteries can not be connected in parallel in order without causing the danger of short circuit. Therefore, as shown in FIG. 9, an inner circuit 40 of this invention is used to coordinate the power supply thereof. The inner circuit 40 is composed of several transistor switches and resistors, wherein the terminals a, b connect the positive and negative terminals of the first battery seat 12, while the terminals c, d connect the positive and negative terminals of the second battery seat 33. When only one battery is used, the battery is disposed in the first battery seat 12, while the second battery seat 33 is closed and not used as shown in FIG. 1. At this time, in the inner circuit 40, the BATT-1 is connected between the terminals a, b while the terminals c, d are open. When SW is closed, Q3 is in ON state and Q1 is also in ON state. Therefore, BATT-1 directly supplies power for the camera 41 and through Q1 for the light 30. When more than one battery are needed, the second battery seat 33 is opened and an additional battery as shown in FIGS. 7 or 8 can be installed thereinto. At this time, in the inner circuit 40, BATT-1 is connected between terminals a, b while BATT-2 is connected between terminals c, d. When SW is closed, Q3 is in OFF state and Q1 is also in OFF state while Q2 is in ON state due to BATT-2. Therefore, BATT-1 supplies power for camera 41 while BATT-2 through Q2 supplies power for the light 30. Thus, even if two different batteries with different capacitances are connected in parallel to supply power, no inter-charging phenomenon will take place.

According to the above arrangement, the present auxiliary illuminating device has the following advantages:

1. The second battery seat is pivotally openable and contained in the light so that the volume and weight are reduced.

2. On a long term of use situation, the second battery seat can be pivoted open for installing an additional battery thereinto to supplement power.

3. Two identical or different batteries can be simultaneously used to supply power.

What is claimed is:

1. An auxiliary illuminating device for a camera, comprising a main body having a front face and a rear face, an engaging base disposed on said front face, a first battery seat disposed on said rear face, an illuminating light, a support rod connecting said illuminating light to said main body, said illuminating light having a light tail including a pivotally openable portion which can be opened to expose a second battery seat contained in said light tail to allow installation of an additional battery therein and inner circuit means engaged to and including said first battery seat and said second battery seat for selectively activating batteries engaged in said first battery seat and said second battery seat.

2. An auxiliary illuminating device as claimed in claim 1, wherein said inner circuit means enables said first battery seat and second battery seat to be connected and permit two identical or two different batteries with different capacitances to be used simultaneously to supply power respectively to said illuminating light and said camera.

* * * * *